United States Patent

[11] 3,625,619

| [72] | Inventor | Karl Otto Ragnar Scholdstrom |
| | | Lidingo, Sweden |
| [21] | Appl. No. | 23,237 |
| [22] | Filed | Mar. 27, 1970 |
| [45] | Patented | Dec. 7, 1971 |
| [73] | Assignee | AGA Aktiebolag |
| | | Lidingo, Sweden |
| [32] | Priority | Mar. 28, 1969 |
| [33] | | Sweden |
| [31] | | 4360/69 |

[54] REFRACTION-MEASURING APPARATUS UTILIZING COMMON OPTICAL MODULATOR
3 Claims, 1 Drawing Fig.

[52] U.S. Cl. ..................................... 356/128, 356/5
[51] Int. Cl. ..................................... G01n 21/46
[50] Field of Search ........................... 356/128, 129, 107, 5

[56] References Cited
UNITED STATES PATENTS

| 3,200,698 | 8/1965 | Froome et al. | 356/5 |
| 3,409,369 | 11/1968 | Bickel | 356/28 |

*Primary Examiner*—Ronald L. Wibert
*Assistant Examiner*—T. Major
*Attorney*—Larson, Taylor & Hinds ABSTRACT: Modulated light containing components of two different wavelengths is transmitted over a path and the modulation phase difference at the receiving end of the path is determined. A common optical modulator is used for demodulating both of the received light components in order to minimize differences in phase between these two components.

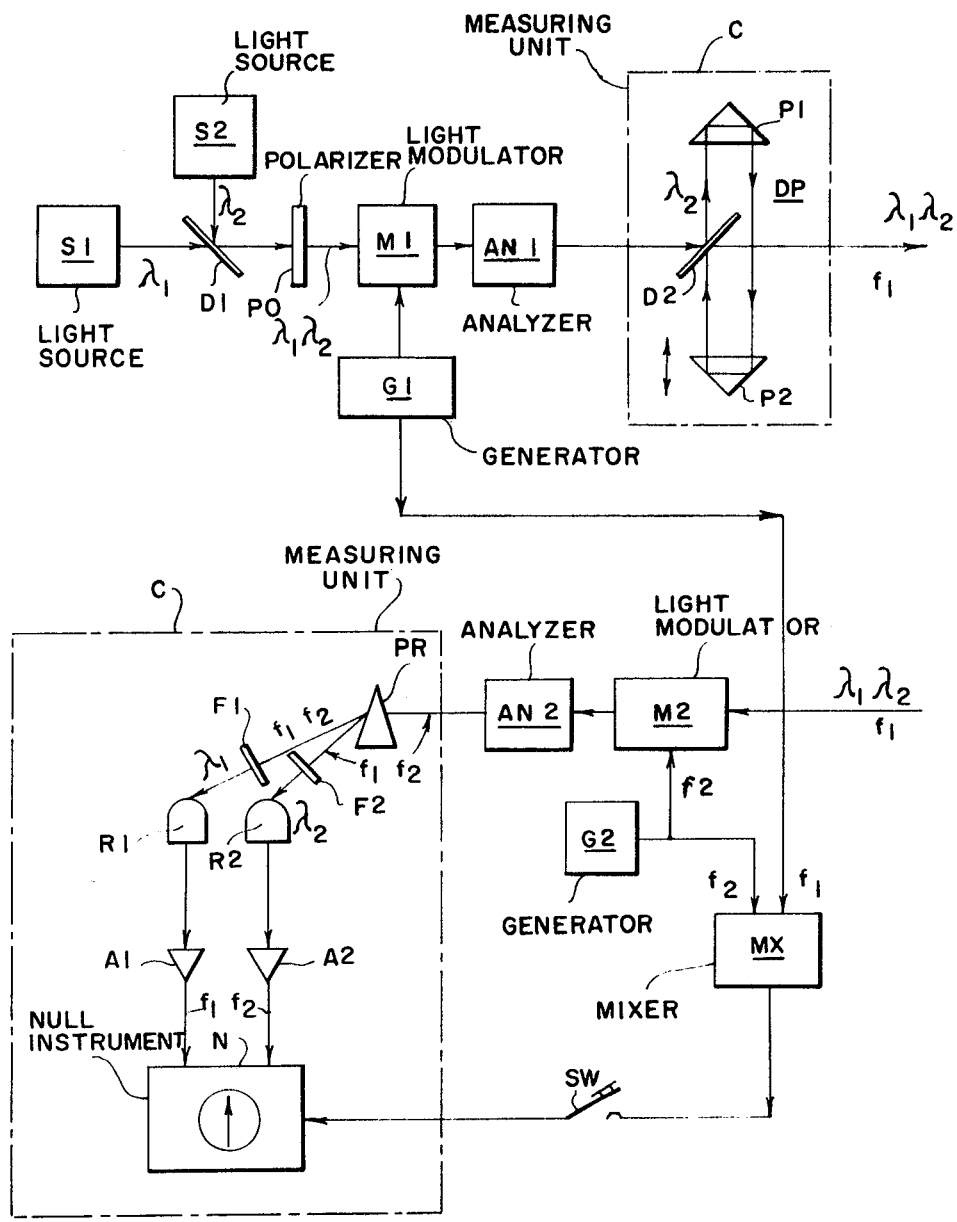

REFRACTION-MEASURING APPARATUS UTILIZING COMMON OPTICAL MODULATOR

FIELD OF THE INVENTION

The present invention relates to the measurement of atmospheric refraction with the aid of light containing components of two wavelengths.

BACKGROUND OF THE INVENTION

In systems wherein atmospheric refraction is determined using light having components of two wavelengths, the two components are emitted over a path of predetermined length, the light being modulated at the beginning of the path and the modulation phase difference between the two components being measured at the receiving end of the path. This type of measurement is based on the well-known fact that the index of refraction varies with wavelength, the difference in velocity for the two components of different wavelengths thus being proportional to the corresponding difference between the indices of refraction for the wavelengths. Hence, since the difference between the wavelengths is known, by measuring the phase difference it is possible to establish the average value of the index of refraction over the path traversed by the light.

It will be appreciated that the difference in velocity of light transmitted at two different wavelengths visible light is of very small order relative to the velocity of light and thus in order to measure the phase difference between two components of different wavelengths with reasonable accuracy, it is of fundamental importance to eliminate any phase error in the measurement. In prior systems of the type discussed above, separate modulators are used at the receiving end of the path for superimposing a demodulation frequency on the two components. Such systems suffer shortcomings in the accuracy of the measurements provided thereby because of the delay introduced in the modulators themselves. For example, where a commonly used electro-optical modulator such as the photomultiplier tube is utilized the transit time of the electrons gives rise to appreciable phase delay.

SUMMARY OF THE INVENTION

In accordance with the present invention phase errors of the type described are eliminated through the use of a common optical modulator which is traversed by both of the received light components. Such an arrangement not only guarantees equality of delay for the two components of different wavelengths but, in addition, enables a single transmitted modulation frequency to be utilized in that the two components, after optical demodulation, can be optically separated so that the phase measurement can be performed on the electrical signals derived from the optically separated components.

It will be appreciated that if the two components are both applied to the same photomultiplier tube for demodulation and are modulated alternatively by different frequencies any variation with time in the conditions along the path will tend to influence the final result. Such time dependence is avoided with the system of the present invention in that no frequency alternation is required.

A refraction measuring apparatus incorporating the present invention comprises, (in addition to means for emitting a beam of light having first and second components of first and second wavelengths along a predetermined path, a first modulator for modulating the first and second components with a modulation signal of the first frequency and means for measuring the modulation phase difference between the first and second components after the components have traversed the predetermined path), a further modulator for modulating the first and second components after these components have traversed the path, optical separating means such as a prism for separating the output of the further modulator into the first and second components, means, such as a photomultiplier tube, for receiving the first and second components after the components have been separated and for producing output signals in accordance therewith, and phase responsive means for receiving the output signals produced by the "receiving means." In accordance with a presently preferred embodiment the phase measurement is performed using a null instrument responsive to the phase difference between the received components and a delay device for adjustably delaying one of the components. The further modulator preferably modulates the received components with a frequency different from the first frequency.

Other features and advantages of the invention will as set forth in or apparent from the detailed description of a presently preferred embodiment set forth hereinbelow.

DESCRIPTION OF THE DRAWINGS

The single figure in the drawing is a schematic block diagram of a refraction-measuring system incorporating the present invention.

DESCRIPTION OF THE PREFERRED EMBODIMENTS

The system shown in the drawing includes first and second light sources S1 and S2 which emit a first beam of light of a first wavelength $\lambda_1$ and a second beam of light of a second wavelength $\lambda_2$, respectively. The output beams produced by light sources S1 and S2 are combined by a dichroic mirror D1 into a common beam which is passed through a polarizer PO, a first light modulator M1, and a first analyzer AN1, to a second dichroic mirror D2. Dichroic mirror D2 splits the beam into the original components thereof, the component of the first wavelength $\lambda_1$ passing directly through mirror D2 and the second component of the wavelength $\lambda_2$ being deflected towards a delay device providing a variable delay path DP. The delay device includes first and second prisms P1 and P2, prism P2 being adjustable so as to vary the delay path DP. After traversing the delay path DP the second component is deflected by dichroic mirror D2 so that the two components again form a single beam.

Light modulator M1 may comprise a conventional light modulating device such as a Kerr cell or a Pockels-type modulator. A generator G1 produces a modulation input signal of a frequency $f_1$ so that both of the components of the output of modulator M1 are modulated by a frequency $f_1$.

After being processed as discussed hereinabove, the reconstituted light beam traverses a path of predetermined length. For the embodiment under consideration it will be assumed that this path is traversed twice, a reflector being placed at the far end of the path so that the beam is returned. The returning beam is applied to a second modulator M2 and an associated second analyzer AN2. A second generator G2 produces an output of frequency $f_2$ which is applied to modulator M2 so that the output at analyzer AN2 contains both modulation frequencies ($f_1$ and $f_2$) superimposed thereon. It will be appreciated that both light components are modulated by the second frequency with exactly the same phase so that phase delays are eliminated.

The light output of analyzer AN2 is passed through a prism PR which splits the light into the components of wavelength $\lambda_1$ and $\lambda_2$. These components are passed through filters F1 and F2, respectively. It is noted that filters F1 and F2 should be capable of suppressing the undesired wavelength, that is, the component of the other wavelength, with a very high degree of accuracy. In fact, the accuracy of the final measurement depends on the ability of the filters to perform this function in that even a very small spurious content of the other component in the output of the filter designed to pass the first component will result in a substantial decrease in the sensitivity of the measurement.

The filtered components are applied to first and second light receivers in the form of photomultiplier tubes R1 and R2. Because of the nonlinearity of tubes R1 and R2, these components are transformed into electrical signals containing the difference frequency $f_1-f_2$ as well as the sum frequency $f_1+f_2$ in accordance with the known operation of such tubes. The outputs of phototubes R1 and R2 are applied, respectively, to first and second amplifiers A1 and A2. The amplifier circuits may include conventional filter circuits for filtering out the sum frequency (although other conventional techniques may be used), the difference frequency signals being applied to first and second inputs of a null instrument N which responds to the phase difference between the applied difference-frequency signals.

The modulation signals of frequency $f_1$ and $f_2$ are also applied to a mixer MX which produces an output signal of the difference frequency $f_1-f_2$. The output of mixer MX is connected through a switch SW to a third input of null instrument N.

Considering the operation of the system described hereinabove, for refraction measurements switch SW is open so that mixer MX is disconnected from null instrument N. The two components of the light beam, of wavelengths $\lambda_1$ and $\lambda_2$, respectively, are modulated by modulator M1 with a modulation frequency $f_1$.

Before beginning the measurement adjustable prism P2 is positioned such that the first and second components are in phase quadrature when applied to null instrument N under conditions where the translation path, i.e., the external path, is bypassed. Stated differently, prism P2 is adjusted to a position corresponding to zero length for the translation path. The bypassing of the translation path can be achieved by conventional means such as through the use of an internal light path provided within the apparatus and having a length of $c/4f_1$, where $c$ is the velocity of light.

During the refraction measurement the beam is transmitted over the external path and reflected at the far end so as to return to the instrument after traveling a distance equal to twice the known distance. After traversing the external path the modulated components are both applied to the second modulator M2, these components now having, because of the difference in velocity over the path, phase values which are no longer in quadrature but which deviate from being in quadrature by an amount corresponding to the difference in the transmission time over the path. The components are modulated with a second modulation frequency $f_2$ and the output of modulator M2 and analyzer AN2 has an envelope of the difference frequency $f_1-f_2$. It is noted that this frequency transposition is not theoretically necessary although in practice this transposition enables the phase comparison to be performed at a lower frequency. The light output signal from second analyzer AN2 is split by prism PR and the two components are passed through corresponding filters F1 and F2 to photomultiplier tubes R1 and R2. Tubes R1 and R2 convert the light signals into electrical signals and the nonlinearity of the tubes R1 and R2 produces, among other signals, electrical signals of the difference frequency $f_1-f_2$ as set forth hereinabove. The frequency transposition does not, as is well known in the art, change the relative phase between the two components, this phase remaining the same when the corresponding electrical signals are applied to amplifiers A1 and A2. Amplifiers A1 and A2 are designed to provide equal phase delay, a requirement which is relatively easy to meet at the low frequency $f_1-f_2$. Hence, the two signals applied to the inputs of null instruments are of the same phase difference. Null instrument N will now read a value different from zero because of the difference in phase delay produced over the transmission path. The prism P2 is then adjusted to compensate for this difference and hence to restore the reading of instrument N to zero. It will be appreciated that the change in delay corresponding to the adjustment of prism P2 required to null the instrument N corresponds to the difference in phase delay over the transmission path and hence prism P2 may be provided with a graduated scale to indicate the phase value. Hence, null instrument N and the associated apparatus shown within the chain lines in the drawing cooperate with adjustable prism P2 and the optics associated therewith also enclosed in chain lines to form a measuring unit generally denoted C.

With switch SW in the closed position thereof, the phase of the difference $(f_1-f_2)$ signal produced by mixer MX can be compared with that of the second component. As before, prism P2 is adjusted until null instrument N reads zero and thus the delay path DP will now indicate the length of the path over which the light is transmitted. Of course, this latter measuring method is known per se.

It is noted that the use of the first analyzer AN1 is not absolutely necessary. For example, the light could be transmitted over the external path in a polarization-modulated form directly upon issuing from the first modulator M1. However, in many types of measurements the first modulation is preferably transformed into an amplitude modulation using means such as the first analyzer AN1.

Although the invention has been described relative to a specific exemplary embodiment thereof, it will be appreciated by those skilled in the art that other modifications and variations in this exemplary embodiment may be effected without departing from the scope and spirit of the invention as set forth in the foregoing specification and the subjoined claims.

What is claimed is:

1. In a refraction-measuring apparatus comprising, means for emitting a beam of light having a first component of a first wavelength and a second component of a second wavelength along a predetermined path, first modulator means for modulating said first and second components with a first modulating signal of a first frequency, and means for measuring the modulation phase difference between said first and second components after said components have traversed said path, wherein the improvement comprises means for reducing phase error between said components, said means comprising second modulator means for commonly modulating said first and second components after said components have traversed said path with a frequency different from said first frequency, optical separating means for receiving the output of said second modulator and for optically separating said output into said first and second components, means for receiving said first and second components after said components have been separated in said optical separating means and for producing output signals in accordance with said components, and phase responsive means for receiving said output signals.

2. An apparatus as claimed in claim 1 wherein said phase responsive means comprises a null instrument responsive to the phase difference between said first and second received components, said apparatus further including means for adjustably delaying one of said components.

3. An apparatus as claimed in claim 2 wherein said first and second modulators are Pockels-type modulators.

* * * * *